March 22, 1960     V. L. STREETER     2,929,402
ADJUSTABLE FLOW CONTROL
Filed July 30, 1954     3 Sheets-Sheet 1
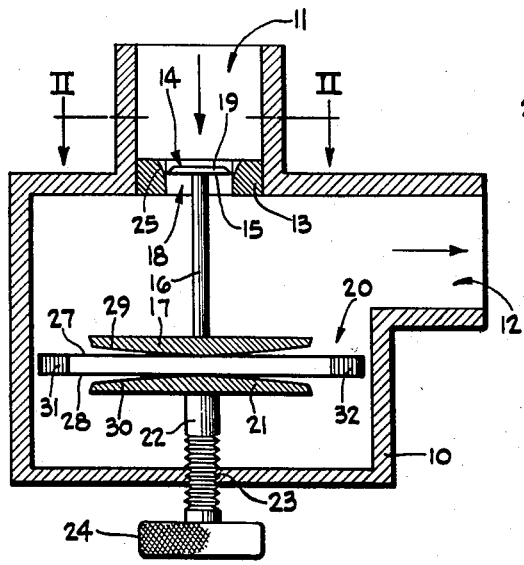
FIG. 1
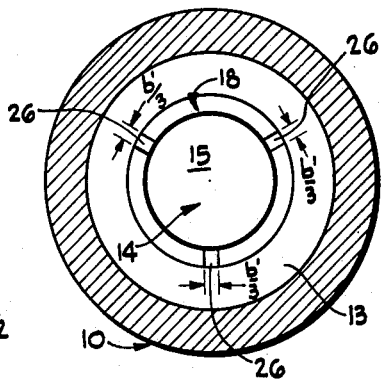
FIG. 2
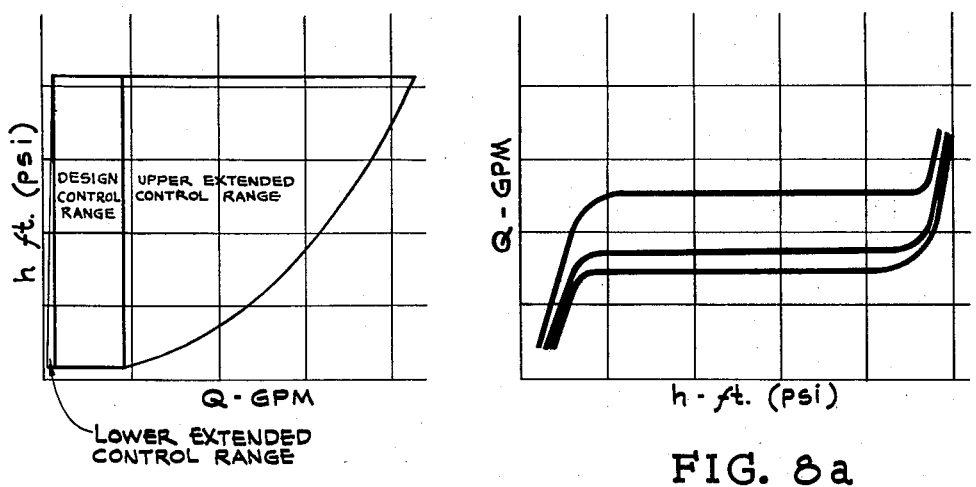
FIG. 8
FIG. 8a
INVENTOR
VICTOR L. STREETER
BY *Hill, Sherman, Meroni, Gross & Simpson*
ATTORNEYS $\theta = \dfrac{M\ell}{EI}$ $\theta = \dfrac{P\ell^2}{2EI}$

INVENTOR
VICTOR L. STREETER

INVENTOR
VICTOR L. STREETER

United States Patent Office 2,929,402
Patented Mar. 22, 1960

2,929,402

ADJUSTABLE FLOW CONTROL

Victor L. Streeter, Chicago, Ill., assignor to The Dole Valve Company, Chicago, Ill., a corporation of Illinois Application July 30, 1954, Serial No. 446,867

10 Claims. (Cl. 137—517)

The present invention relates to adjustable flow control, and more particularly relates to a flow control of fluids so that fluid flow may be maintained at a substantially constant adjusted rate substantially irrespective of fluid pressure.

In the development of fluid flow control devices, such as water valves and the like, there has been a constant effort, on the part of the industry, to provide such a device which will have a substantially constant flow rate characteristic substantially independent of the fluid pressure or head at the inlet to the device or the fluid pressure drop across the device.

As an example, in the development of hot liquid valves, such as those varying through the range of from car heater valves to shower bath valves, it has been found to be most desirable to have a valve structure through which the liquid flow rate will be substantially constant irrespective of the pressure drop across the valve. Further, of course, it is also highly desirable to provide such a valve structure with means to adjust the flow rate therethrough to any particularly desired flow rate within the design range of the valve and to then have that selected flow rate maintained substantially constant by the valve without variation due to changes in the inlet fluid pressure or head or changes in the pressure drop across the valve.

Various heretofore known efforts to achieve these ends have not been as successful as is desired since although the valves produced as a result of these efforts have been pressure sensitive and adjustable, they have not maintained the flow rate constant at the selected values therefor. Some such valves have been considered to be more or less successful since they did limit the flow rate to the selected value at one or more points in the design pressure range. Pressure variations away from such points, however, resulted in variations in the flow rate through the valve thereby rendering the valve at least partially unsuccessful.

Such failures, particularly in orifice and metering type valve, it has been found by the present invention, were due in part to the fact that the metering pin or poppet, or the orifice plate of such a valve was biased by a spring or springs, or various other resilient devices, which had linear load rates. That is, the biasing means for the poppet or the orifice plate was such that while being pressure sensitive nevertheless varied linearly with the force applied to the resilient means and the displacement thereof had a linear characteristic with respect to the load thereon. This resulted in straight line pressure versus valve displacement movement or valve element characteristics for these valve structures and an obvious inability to compensate for the quadratic relationship between the pressure and the flow rate.

Another equally important cause for the lack of success in the prior art devices, it was found by the present invention, was a direct result of the particular profile curvature or envelope which was given to the head of the metering pin or poppet. Most such envelopes have been developed experimentally or empirically and the best results favored a profile characteristic which, when plotted, appeared as a straight line on a semi-logarithmic chart.

A poppet profile or envelope which is a revolution of a pure logarithmic function fails to take into account several of the details which are important for a device of this class as will be developed in detail hereinbelow.

Thus, it will be observed, that although there have been attempts in the prior art to develop adjustable flow control devices having a straight line of pressure versus flow rate characteristic within the design range, these efforts have failed since the poppets were not properly designed and the biasing devices did not have the proper characteristics.

It is, therefore, an important object and feature of the present invention to provide a new and improved adjustable flow control wherein the fluid flow rate through the control device will be substantially constant, substantially independent of fluid inlet pressure and/or fluid drop across the device, at least within the design range of the device.

Another important feature of the present invention is to provide a new and improved adjustable flow control device wherein there is provided a flow orifice and a poppet or metering pin, one of which is biased by a spring having non-linear characteristics and one of which has a revolution profile or limiting envelope which is cooperative with the non-linear biasing device in such a coordinated manner that the liquid flow rate through the flow control device will be maintained substantially constant irrespective of variations in the fluid pressure drop across the orifice and poppet.

Still another object of the present invention is to provide a new and improved adjustable flow control valve with a new and improved biasing spring for the poppet or the orifice plate which has non-linear characteristics that are proper to maintain the flow rate substantially constant irrespective of variations in fluid pressure.

Another object of the present invention is to provide a new and improved orifice and metering pin type fluid flow control device wherein the envelope of the metering pin or the orifice is such as to provide the device with straight line fluid flow characteristics with respect to fluid pressure so that the fluid flow rate through the control device will be maintained substantially constant, substantially without regard to changes in fluid pressure.

Yet another object of the present invention is to provide a new and improved metering valve poppet or metering valve orifice defining member having an envelope following the relation of $$C_D A = (C_D A)_{\min} e^{\frac{x' \ln H}{2Y_0}}$$

Yet another object of the present invention is to provide a new and improved metering valve poppet or metering valve orifice defining member having an envelope following the relation of $$x = \frac{2Y_0}{\ln H}\left\{\ln\left[2\sqrt{2}\frac{r_0 + \frac{t}{2} - \frac{b'}{2\pi}}{(r' - r_0)(r' + r_0 - b'/\pi)}\frac{Y_0}{\ln H}\sqrt{1 - \sqrt{1 - \left(\frac{t\ln H}{Y_0}\right)^2}}\right] - \frac{1}{2}\left[1 - \sqrt{1 - \left(\frac{t\ln H}{Y_0}\right)^2}\right]\right\}$$

Yet another object of the present invention is to provide a new and improved metering valve poppet or metering valve orifice defining member having an envelope following the relation of $$x = \frac{2Y_0}{lnH}\left\{ln\left[2\sqrt{2}\frac{r_0+\frac{t}{2}}{r'^2-r_0^2}\frac{Y_0}{lnH}\sqrt{1-\sqrt{1-\left(\frac{tlnH}{Y_0}\right)^2}}\right] - \frac{1}{2}\left[1-\sqrt{1-\left(\frac{tlnH}{Y_0}\right)^2}\right]\right\}$$

Yet another object and feature of the present invention is to provide a new and improved fluid flow control device wherein the resilient means biasing the poppet or the orifice defining member follows the law of $$h = h_0 H e^{\frac{-ylnH}{Y_0}}$$

Yet another object and feature of the present invention is to provide a new and improved fluid flow control device wherein the resilient means biasing the poppet or the orifice defining member follows the law of $$\frac{Y_0}{2lnh}ln\frac{2F}{F_0}+\frac{F_0 l^3}{24 EI}=\frac{1}{6}(l-x_0)^2\frac{d^2y_0}{dx_0^2}+\frac{2}{3}(l-x_0)\frac{dy_0}{dx_0}+y_0$$

Yet another object and feature of the present invention is to provide a new and improved fluid flow control device wherein the resilient means biasing the poppet or the orifice defining member follows the law of $$\bar{y}=\frac{3l}{4lnH}[(1-\bar{x})^2-2ln(l-\bar{x})-1]$$

for a backing member for the spring.

Yet another object of the present invention is to provide a new and improved adjustable flow control device wherein the metering pin or poppet is adjustably supported on a pair of springs which are of the double cantilever type and which have their outer ends secured together.

Yet another object of the present invention is to provide a new and improved flow control device of the class described wherein the poppet is resiliently supported on springs backed by contoured backing members having faces which are contoured to give the springs the proper non-linear characteristics desired.

Yet another object of the present invention is to provide a new and improved adjustable flow control device wherein a profiled poppet is variously displaceable in the aperture of an orifice defining member to control fluid flow for an adjustable substantially constant fluid flow rate without changes due to variations in the pressure.

Yet another object of the present invention is to provide a new and improved adjustable flow control device wherein the poppet is resiliently supported by a spring having the described non-linear characteristics.

Yet other objects, features and advantages of the present invention will readily present themselves to those skilled in the art from the following detailed description of the present invention and embodiments thereof, from the claims, and from the drawings in which each and every detail shown is fully and completely disclosed as a part of this specification, in which like reference numerals refer to like parts, and in which:

Figure 1 is a more or less diagrammatic illustration of an adjustable fluid flow control device embodying the principles of the present invention;

Figure 2 is a transverse fragmental sectional view of the embodiment of Figure 1 shown as taken substantially along the line II—II of Figure 1;

Figures 8 and 8a are graphic examples of the flow versus head or pressure characteristics of adjustable flow control devices embodying the principles of the present invention;

As shown on the drawings:

Figure 3:
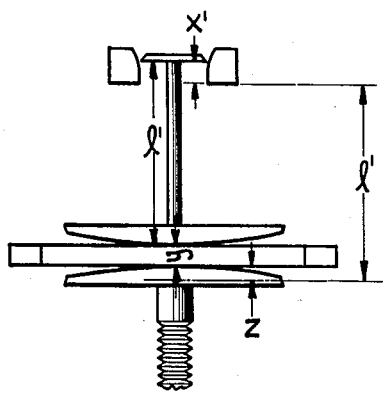
Figures 3, 4, 5, 6 and 7 are schematic illustrations of various parts of the device of Figure 1 and are dimensioned and identified with alphabetical indicia to illustrate various factors which are considered in the design of the device of Figures 1 and 2.

There is illustrated in Figures 1, 2, 9 and 10 various flow control devices which are adjustable and which are operative to maintain the liquid flow rate therethrough substantially constant at the selected value therefor without variation due to variations in the fluid pressure at the inlet to the valve structures or variations in the fluid pressure drop or head drop across the valve structure. Each of these devices incorporates therein a non-linear resilient backing device, the characteristics of which are fully developed hereinbelow. In addition, each of these valve structures has a poppet or an orifice throat which is profiled to have a curvature in accordance with the laws which are developed hereinbelow. The curved profiles and the non-linear springs are, however, so coordinated and related that fluid flow through these devices will be maintained substantially constant thereby substantially independent of fluid pressure at least within the control range and substantially independent of fluid pressure in certain regions of fluid pressure and adjusted flow rates outside of the full design range.

In the embodiment of the invention schematically and diagrammatically illustrated in Figures 1 and 2 there is provided a valve housing 10 having a fluid inlet 11 and a fluid outlet 12. In the fluid inlet 11, or otherwise within the valve housing 10 between the fluid inlet 11 and the fluid outlet 12 there is provided orifice defining means such as an orifice block or orifice plate 13 with which there is cooperatively arranged a poppet or metering pin valve closure means 14.

The poppet 14 of the embodiment of Figures 1 and 2 actually includes a poppet plate 15 which is supported at the end of a poppet stem 16 that is secured to a first backing member 17. The poppet plate 15 is reciprocally disposed within the orifice or annulus 18 defined by the member 13 and adjustably controls fluid flow through the area between the peripheral knife edge 19 of the plate 15 and the hroat profile face of the member 13.

The contoured backing member 17 is supported on or secured to resilient spring means 20 which is also secured to or supported on a second backing plate 21 which is fixed on an adjusting screw 22 threaded through the housing 10 as at 23 and carrying a manual, or otherwise powered, adjusting knob 24.

Thus it may be seen that by proper manipulation of the adjusting knob 24 and therefore the adjusting screw 22, the poppet plate 15 will be resiliently adjustably and reciprocally positioned axially in the orifice 18 in the member 13 to adjust the flow of fluid through the annular area between the knife edge 19 of the orifice plate 15 and the face of the member 13.

The face 25 of the member 13 is so contoured that it has a profile or envelope which follows the laws developed hereinbelow whereby the flow rate will be held substantially constant at any desired adjusted value therefor by resilient axial movement of the poppet 14 thereacross. In its axial movement, the poppet 14 is guided by guides 26—26—26 which are secured to or form a part of the face 25 of the orifice member 13.

The non-linear spring assembly 20, in this embodiment of the invention, comprises a pair of double cantilever type spring members or leafs 27 and 28 which respectively engage contoured surfaces 29 and 30 of the backing plates 17 and 21 and are appropriately spaced by and secured together by spacing and mounting blocks 31 and 32 at the ends of the double cantilever type leafs 27 and 28.

The contoured faces 29 and 30 of the backing plates 17 and 21, respectively, are contoured in accordance with the laws developed hereinbelow so that the springs will lie down thereagainst, with increasing fluid pressure at the inlet 11 and increasing fluid pressure drop across the poppet plate 15 and orifice defining member 13, in a manner of increasing the spring load rate which is cooperatively designed with the contour 25 of the orifice defining member 13 so as to accomplish the stated result.

That is, as pressure drop across the poppet and orifice arrangement increases the poppet will be pressed against the springs with greater force so that an increasing part of the contoured surfaces 29 and 30 of the backing members 17 and 21 will back up the double cantilever leaf springs 27 and 28 thereby increasing the spring load rate of these resilient members and increasing the expansion forces thereagainst thereby bucking the increased pressure with increased force.

Figure 9:
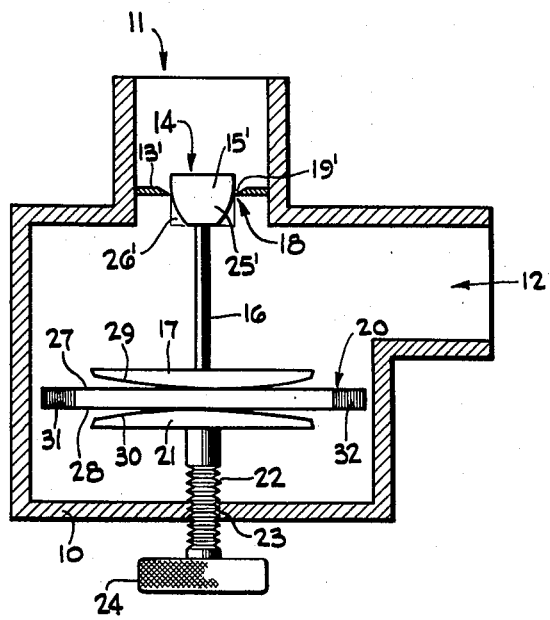
Figure 9 is a more or less schematic illustration of another embodiment of the present invention.

In the embodiment of Figure 9 all of the same principles apply and the construction is substantially similar to the embodiment of Figures 1 and 2 except that the orifice member 13' is a knife edge plate defining an annulus or orifice 18 and the poppet plate 15' has a contoured face which obeys substantially the same laws as those which are set out hereinbelow for the orifice throat 25 of the orifice defining member 13. The surface of the poppet head 15' cooperates with the knife edge 19' of the orifice plate 13' in the manner described for the cooperation between the surface 25 and the knife edge 19 in the embodiment of Figure 1 and this surface 25' is designed in coordination with the surfaces 29 and 30 of the backing plates 17 and 21 to cooperate with double cantilever type leafs 27 and 28 of the spring assembly 20 to maintain the flow rate through the valve substantially constant at any desired flow rate as adjusted and selected through manipulation of the adjusting knob 24 and the adjusting screw 22.

Figure 10:
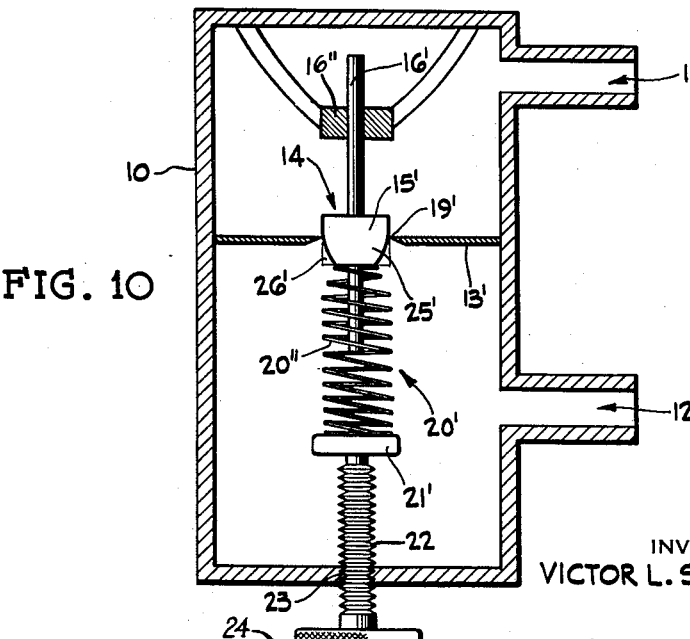
Figure 10 is a more or less schematic and diagrammatic illustration of still another form of embodiment of the present invention.

In the embodiment illustrated in Figure 10 the valve structure is operative substantially identical to the operation of the valve structure illustrated in Figure 9 but in this embodiment of the present invention the spring assembly 20' is supported on a backing plate 21' which merely forms a spring rest for the coil spring 20" of variously spaced convolutions. By spacing the convolutions of the spring at increasing dimensions in a direction approaching the poppet 15', which is carried on a poppet pin 16' slidably guided in a bearing way 16", the forces of the spring and the spring rate will be continuously increasing as the convolutions successively lie down and become solid by physical abutment with the immediately lower convolution. This spring and such springs as conical springs which will similarly have the convolutions thereof lie down in order will also follow the laws set out hereinbelow for cooperation with the profile 25' bearing guides 26' to maintain the flow rate substantially constant substantially irrespective of pressure and at the adjusted value. Herein, it should be noted that all of the valve structures illustrated in Figures 1, 2, 9 and 10 may be closed by backing off the adjusting screws 22 to a point where the poppet heads 15 and 15' will close the space with the orifice plate members 13 and 13' respectively.

In Figures 8 and 8a there are illustrated, respectively, an example of a design control range and the extended control range for such valve structures as those illustrated in Figures 1, 9 and 10, and the family of substantially flat flow rate curves illustrating that adjustable flow control devices embodying the principles of the present invention will maintain the flow rate substantially constant at preselected and adjustable desired values substantially independent of variation in the pressure of the fluid at the inlet to the valve structure or the pressure drop across the orifice and metering pin or poppet head.

In Figure 8 it is particularly to be noted that the valve structures are universally operable throughout their entire design control range and are further operable to maintain the flow rates substantially constant at excessively high or extremely low fluid flow rates in accordance with the extended control range curves therein illustrated.

The control range and the extensions thereof will be more fully understood in connection with the development of the laws for the orifice or poppet profiles and the springs as set out hereinbelow.

Referring now to Figures 1 through 7 generally for the development of these various control laws such as the profile laws and the spring laws, it will be seen that there is illustrated a flow control device consisting essentially of a disc moving axially within a profile throat section and resisted by a non-linear spring. The unique relationship between the throat profile and the non-linear spring resistance of the spring is so developed that an infinitely variable flow controller without inherent error, results. Figure 1 shows one form of such a device. Increasing head drop across the disc displaces it downstream such that the annular area reduces inversely as the square root of the head, thereby holding the discharge constant. By displacing the spring support axially the discharge is varied and controlled.

The general theory is developed first, resulting in equations for the annular area and the spring law. The actual throat profile equation is then developed, and design data for the device is determined. Its limitations are worked out and the effects of viscosity, changes in discharge coefficient and hysteresis, etc., are discussed as a part of this specification. While several of the symbols utilized herein are illustrated dimensionally on the drawings, and particularly in Figures 2, 3, 4, 5, 6 and 7, all of the symbols are defined as follows:

$A$ = area of opening between valve head and throat
$b$ = width of leaf spring
$b'$ = total thickness of guide fins
$C_D$ = discharge coefficient
$E$ = modulus of elasticity
$e$ = base of natural logarithms
$F$ = pressure force on valve head
$F_0$ = minimum design force on valve head
$g$ = acceleration due to gravity
$H$ = ratio of maximum fluid head to minimum fluid head
$h$ = fluid head drop across valve head
$h_0$ = minimum design fluid head loss across valve head
$I$ = moment of inertia of spring section about neutral axis
$K_0$ = stiffness of spring of length $l$
$l$ = length of spring for load $F_0/2$
$l'$ = length of disc support shaft
$ln$ = natural logarithm
$M$ = moment
$P$ = force
$Q$ = discharge
$r$ = radial coordinate of throat
$r'$ = minimum throat radius
$r_0$ = disc radius
$S_m$ = maximum fibre stress
$s$ = distance from valve head to throat
$t$ = radial distance $r-r_0$
$t_s$ = thickness of spring
$X$ = function of $x'$
$x$ = axial coordinate of throat or valve head profile
$x'$ = position of valve head in throat
$x_0$ = coordinate of spring backing
$\bar{x}$ = dimensionless length $x_0/l$
$Y$ = function of $y$
$Y_0$ = position of spring for $h=h_0$
$y$ = position of spring $y_0$ = coordinate of spring backing
$\bar{y}$ = dimensionless length $y_0/Y_0$
$Z$ = function of $z$
$z$ = position of spring support
$\bar{z}$ = dimensionless variable of integration
$\alpha$ = constant
$\alpha_1$ = constant
$\alpha_2$ = constant
$\beta$ = constant
$\beta_1$ = constant
$\beta_2$ = constant
$\gamma$ = specific weight of fluid
$\delta$ = deflection of single spring from minimum design head position
$\theta$ = angular deflection of end of spring

The theory of the flow controller

With reference to Figure 3, the position of the disc within the throat is given by $x'$. The setting of the spring is given by $z$, conveniently measured from a fixed line at a distance $l'$ from the minimum throat section. $l'$ is also the length of the stem supporting the disc, as shown.

The particular spring configuration shown is that of four restrained tip cantilever leaf springs with profiled backing. The backing tends to shorten the spring as it is loaded, thereby stiffening it. The amount of compression of the spring assembly depends upon the dimension $y$.

From the geometry of Figure 3 it will be seen that $$x' = y + z \qquad (1)$$

The product of discharge coefficient, $C_D$, and annular area, $A$, is some unknown function of $x'$, say $X(x')$, i.e., $$AC_D = X(x') \qquad (2)$$

The spring positioning $y$ is some unknown function $Y$ of the head $h$ acting across the disc, and is given by $$h = Y(y) \qquad (3)$$

For the flow to be completely compensated for head change, the discharge $Q$ must be a function $(Z)$ of $z$, the setting of the spring support, and is $$\frac{Q}{\sqrt{2g}} = Z(z) \qquad (4)$$

where the constant $\sqrt{2g}$, with $g$ the acceleration due to gravity, conveniently included in the equation.

The general discharge equation, when velocity of approach is neglected, is $$Q = C_D A \sqrt{2gh} \qquad (5)$$

Substituting Equations 2, 3 and 4 into equation 5 it will be seen that $$Z(z) = X(x')[Y(y)]^{\frac{1}{2}} \qquad (6)$$

which yields a condition that must be fulfilled by the unknown functions. Taking the natural logarithm $(ln)$ of Equation 6, and comparing the same with Equation 1, $$lnZ(z) = lnX(x') + \tfrac{1}{2}lnY(y) \qquad (7)$$

it is observed that Equation 6 is satisfied by $$Z(z) = \alpha e^{\beta z}, \ X(x') = \alpha_1 e^{\beta_1 x'}, \ Y(y) = \alpha_2 e^{-2\beta_2 y} \qquad (8)$$

subject to $$\alpha = \alpha_1 \sqrt{\alpha_2} \qquad (9)$$

and $$\beta = \beta_1 = \beta_2 \qquad (10)$$

To find the coefficients and exponents, which are herein merely constants, the spring relationship of Equations 3 and 8 yield $$h = \alpha_2 e^{-2\beta_2 y} \qquad (10')$$

When $h = h_0$, the minimum control head, let the distance $y$, between spring leaves at the center be $Y_0$, and when $h = h_0 H$, the maximum design head, let $y = 0$. $H$ is the ratio of maximum head to minimum head. Then $\alpha_2 = h_0 H$ and $\beta_2 = lnH/2Y_0$, and $$h = h_0 H e^{-\frac{y\,lnH}{Y_0}} \qquad (11)$$

which, when solved for $y$, yields a spring equation for any given head.

Now, using Equations 4 and 8, with the values of $\beta = \beta_2$, $$\frac{Q}{\sqrt{2g}} = \alpha e^{\frac{z\,lnH}{2Y_0}} \qquad (11')$$

The minimum controlled discharge $Q_{min}$ is given by the maximum head, $h_0 H$ acting with the minimum area, i.e. the annular area between minimum throat diameter and disc. This occurs for $x' = 0$, $y = 0$, and therefore $z = 0$, hence $$\alpha = \frac{Q_{min}}{\sqrt{2g}}$$

and the discharge relationship becomes $$Q = Q_{min}\, e^{\frac{z\,lnH}{2Y_0}} \qquad (12)$$

Using Equations 2 and 8 with the value $\beta = \beta_1$ inserted therein $$C_D A = \alpha_1 e^{\frac{x'\,lnH}{2Y_0}} \qquad (12')$$

Now $C_D A = (C_D A)_{min}$ for $x' = 0$, hence $$C_D A = (C_D A)_{min}\, e^{\frac{x'\,lnH}{2Y_0}} \qquad (13)$$

which represents the throat profile law where $$\alpha_1 = (C_D A)_{min}$$

To prove that Equation 9 is satisfied, substitutions yield $$\frac{Q_{min}}{\sqrt{2g}} = (C_D A)_{min} \sqrt{h_0 H} \qquad (14)$$

which is the equation for minimum control discharge, and proves out with Equation 5.

Equation 11 is the head-displacement relation that the spring must follow, and Equation 13 yields the annular area required as a function of $x'$. Equation 12 yields the discharge as a function of position $z$ of the spring backing. Hence the existence of the functional relationships for the flow controller without inherent error has been established. The equation of the throat profile is next developed.

Equation for the throat profile

By assuming the discharge coefficient to be constant in Equation 13, the throat profile equations can be developed. When experiment yields the variations of $C_D$ with $x'$, the throat profile may be recomputed. The reduced equation is $$A = A_{min}\, e^{\frac{x'\,lnH}{2Y_0}} \qquad (15)$$

where $A_{min}$ is given by $$A_{min} = \pi(r'^2 - r_0^2) \qquad (16)$$

with $r'$ the minimum throat radius and $r_0$ being the disc radius. With fins of total thickness $b'$ to guide the disc, Fig. 2, the minimum area is given by $$A_{min} = \pi(r'^2 - r_0^2) - b'(r' - r_0) \qquad (17)$$

Figure 4:
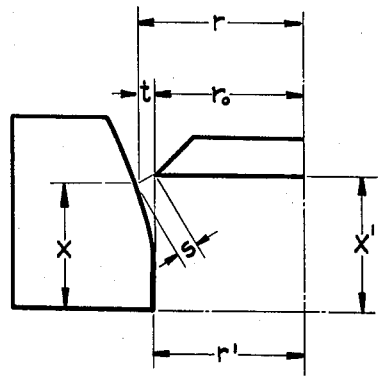

The area $A$, for any $x'$, is given by Pappus Theorem, $$A = 2\pi\left(r_0 \pm \frac{t}{2}\right)s - b's \qquad (18)$$

where $t$ and $s$ are as shown in Fig. 4 the term $t$ being positive for a determination of the throat equation for profiled orifices as in Fig. 1 and further being negative for a determination of the profile of a poppet head as in Figures 9 and 10. Writing $s$ in the form $$s = \sqrt{(x'-x)^2 + t^2} \qquad (19)$$

and inserting the same into Equation 18, it follows that $$A = 2\pi \left[ r_0 \pm \frac{t}{2} - \frac{b'}{2\pi} \right] \sqrt{(x'-x)^2 + t^2} \qquad (20)$$

Combining Equation 20 with Equation 15, $$(r'-r_0)(r'+r_0-b'/\pi)e^{\frac{x'\ln H}{2Y_0}} = 2\left[ r_0 \pm \frac{t}{2} - \frac{b'}{2\pi} \right]\sqrt{(x'-x)^2 + t^2} \qquad (21)$$

For any $x'$, an equation in $x$ and $t$ results that satisfies Equation 15. This equation changes, however, as $x'$ changes. The envelope of the family of curves, however, yields a continuous profile that satisfies Equations 15 and 21. Taking the partial derivative of Equation 21 with respect to $x'$, then dividing the resulting equation into Equation 21 yields $$\frac{2Y_0}{\ln H} = \frac{(x'-x)^2 + t^2}{x'-x} \qquad (22)$$

Solving for $x'$ $$x' = x + \frac{Y_0}{\ln H}\left[ 1 - \sqrt{1 - \left(\frac{t\ln H}{Y_0}\right)^2} \right] \qquad (23)$$

where the minus sign has been taken before the radical so that $x'-x$ becomes small as $t$ decreases. Eliminating $x'$ in Equations 21 and 23 yields the equation of the envelope, $$x = \frac{2Y_0}{\ln H}\left\{ l_n\left[ 2\sqrt{2}\frac{r_0 \pm \frac{t}{2} - \frac{b'}{2\pi}}{(r'-r_0)(r'+r_0-b'/\pi)} \frac{Y_0}{\ln H}\sqrt{1-\sqrt{1-\left(\frac{t\ln H}{Y_0}\right)^2}} \right] - \frac{1}{2}\left[ 1 - \sqrt{1-\left(\frac{t\ln H}{Y_0}\right)^2} \right] \right\} \qquad (24)$$

which is the throat profile when $t$ is taken positively and is the poppet profile when $t$ is taken negatively, in terms of $x$ and $t$. Since $r = r_0 \pm t$, the cylindrical coordinates $(x, r)$ are easily obtained. Herein it should be noted that by eliminating $b'$ terms for the profile equation in embodiments of the invention which do not utilize the guides 26 and 26', the profile equation becomes $$x = \frac{2Y_0}{\ln H}\left\{ l_n\left[ 2\sqrt{2}\frac{r_0 \pm \frac{t}{2}}{r'^2 - r_0^2} \frac{Y_0}{\ln H}\sqrt{1-\sqrt{1-\left(\frac{t\ln H}{Y_0}\right)^2}} \right] \right.$$

$$\left. - \frac{1}{2}\left[ 1 - \sqrt{1-\left(\frac{t\ln H}{Y_0}\right)^2} \right] \right\} \qquad (24')$$

There is a limitation to the value of $t$, however, which is given by setting the discriminate of Equation 23 equal to zero, $$t_m = \frac{Y_0}{\ln H} \qquad (25)$$

The envelope solution breaks down for larger values of $t$. The corresponding maximum values of $x_{max}$ and $x'_{max}$ are $$x_{max} = \frac{2Y_0}{\ln H}\left\{ l_n\left[ 2\sqrt{2}\frac{\left(r_0 \pm \frac{t_m}{2} - \frac{b'}{2\pi}\right)}{(r'-r_0)(r'+r_0-b'/\pi)} t_m \right] - \frac{1}{2} \right\} \qquad (26)$$

and $$x'_{max} = x_{max} + t_m = \frac{2Y_0}{\ln H} l_n\left[ 2\sqrt{2}\frac{\left(r_0 \pm \frac{t}{2} - \frac{b'}{2\pi}\right)}{(r'-r_0)(r'+r_0-b'/\pi)} t_m \right] \qquad (27)$$

*Discharge and head range limitations*

The minimum value of $z$ is zero for control over the whole head range $h_0$ to $h_0 H$, and the maximum value of $z$ is $x'_{max} - Y_0$, as the disc position cannot exceed $x'_{max}$. The maximum controlled discharge is then obtained by substituting $x'_{max} - Y_0$ for $z$ in Equation 12, using Equations 14 and 27, considering $C_D$ constant. A basic design equation in this regard is, $$Q_{max} = C_D\sqrt{2gh_0}2\sqrt{2}\pi\left(r_0 + \frac{Y_0}{2\ln H} - \frac{b'}{2\pi}\right)\frac{Y_0}{\ln H} \qquad (28)$$

The spring travel $Y_0$ and the radius of disc $r_0$ may be selected to give the required maximum discharge for preselected minimum head $h_0$ and head ratio H. The minimum discharge is determined by selection of minimum throat radius, $r'$, for given disc radius and maximum head $h_0 H$.

By moving the spring support to positions where $z$ is less than zero, control is given under the partial pressure range illustrated in Figure 8 where $y > |z|$, which maintains the disc within the throat. The discharge is given by Equations 12 and 14 as $$Q = (C_D A)_{min}\sqrt{2gh_0 H}e^{\frac{z\ln H}{2Y_0}}, -Y_0 \leq z \leq 0 \qquad (29)$$

The "threshold" head range is, from Equations 1 and 11 for $x' = 0$ $$h = h_0 H e^{\frac{z\ln H}{Y_0}} - Y_0 \leq z \leq 0 \qquad (30)$$

Eliminating $z$ in the last two equations, $$Q = (C_D A)_{min}\sqrt{2gh} \qquad (31)$$

yields the lower limiting line, Fig. 8, for flow control.

Similarly, the setting $z$ may be larger than $x'_{max} - Y$ for the partial head ranges where $$y \leq x'_{max} - z$$

The head corresponding to the threshold values of $y$, i.e. where $x' = x'_{max}$, from Equation 11 is $$h = h_0 H e^{-(x'_{max}-z)\frac{\ln H}{Y_0}} \qquad (32)$$

Eliminating $z$ in this equation and Equations 12 and 14, $$Q = (C_D A)_{min}\sqrt{2gh}e^{x'_{max}\frac{\ln H}{Y_0}} \qquad (33)$$

This upper extension of the discharge range is shown in Fig. 8.

*Factors affecting accuracy*

Viscosity effects are very small with this device since the only high velocity is between the sharp-edged or knife-edged portion 19 or 19' and the throat or poppet head.

The change of discharge coefficient as a function of geometry of opening ($x'$), once it is determined experimentally, can be corrected by adjustment of the throat profile.

Dynamic effects due to high flow along the disc are small as the area opening is very small compared with the disc area. By adoption of greater disc areas this effect would be further minimized.

Hysteresis effects would apply to the spring action only, and with metal springs should be extremely small, and even negligible.

Nonlinear spring design and law development

The spring form is shown in Figures 1 and 3 as well as Figures 9 and 10, but is considered here principally with respect to the form of spring shown in Figures 1, 3, and 9 as consisting here of four restrained tip cantilever springs, initially flat, and caused to press against the backing such that the stiffness is increased according to Equation 11. The minimum design force, $F_0$, on the spring is $$F_0 = \pi r_0^2 \gamma h_0$$

where $\gamma$ is the specific weight of fluid. As the force, $F$, increases linearly with the head, Equation 11 may be written as $$y = \frac{Y_0}{lnH} ln \frac{F_0 H}{F} \quad (34)$$

The deflection, $\delta$, of one leaf of the spring from the position of minimum force, $$\frac{F_0}{2}$$

acting on the one spring is $$\delta = \frac{1}{2}(Y_0 - y) = \frac{Y_0}{2lnH} ln \frac{2F}{F_0} \quad (35)$$

Figure 5:
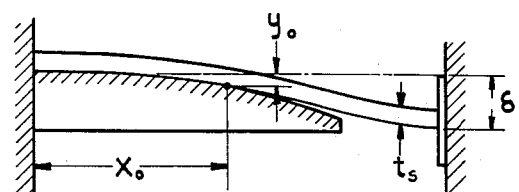

For the minimum design load, $$\frac{F_0}{2}$$

on the single spring, the spring is cantilevered from its full length, $l$, with the backing touching only at $x_0 = 0$, Figure 5. With no load on the spring it will be displaced from the $\delta = 0$ position a distance $-F_0 l^3/24EI$ where E is the modulus of elasticity and I is the section moment of inertia about the neutral axis.

Following the methods developed by S. P. Clurman, as set out in "The Design of Nonlinear Leaf Springs," Trans. A.S.M.E., February 1951, pp. 155–161, a differential equation of the backing profile is developed, based upon beam deflection theory. Considering a point $(x_0, y_0)$ on the backing profile as the last contact between spring and backing for a given load, $F$, the deflection from no load position is given by $$\frac{Y_0}{2lnh} ln \frac{2F}{F_0} + \frac{F_0 l^3}{24EI} = \frac{1}{6}(l-x_0)^2 \frac{d^2 y_0}{dx_0^2} + \frac{2}{3}(l-x_0)\frac{dy_0}{dx_0} + y_0 \quad (36)$$

The right hand side results from consideration of restrained tip deflection of a cantilever leaf such as that employed in the embodiments of Figures 1 and 9. The forces $F$, $F_0$, must be expressed in terms of the stiffness of the spring as follows:

$$F = \frac{F_0}{2} e^{\frac{2\delta lnH}{Y_0}}$$

and $$\frac{dF}{d\delta} = \frac{F_0 lnH}{Y_0} e^{\frac{2\delta lnH}{Y_0}} \quad (37)$$

For $\delta = 0$, its stiffness, $K_0$, is $$\left.\frac{dF}{d\delta}\right|_{\delta=0} = K_0 = \frac{F_0 lnH}{Y_0} = \frac{12EI}{l^3} \quad (38)$$

As the stiffness of a beam varies inversely as the cube of its length, $$\frac{dF}{d\delta} = \frac{F_0 lnH}{Y_0} e^{\frac{2\delta lnH}{Y_0}} = \frac{l^3}{(l-x_0)^3} K_0 \quad (39)$$

Solving for $\delta$, using Equation 38

$$\delta = \frac{Y_0}{2lnH} ln\left(\frac{Y_0}{F_0 lnH}\frac{dF}{d\delta}\right) = \frac{3Y_0}{2lnH} ln \frac{l}{l-x_0} \quad (40)$$

Also from Equation 38

$$\frac{F_0 l^3}{24EI} = \frac{Y_0}{2lnH} \quad (40')$$

Substituting from the last two equations into Equation 36 results in, $$\frac{3Y_0}{2lnH}ln\frac{l}{l-x_0} + \frac{Y_0}{2lnH} = \frac{1}{6}(l-x_0)^2\frac{d^2 y_0}{dx_0^2} + \frac{2}{3}(l-x_0)\frac{dy_0}{dx_0} + y_0 \quad (41)$$

Inserting the dimensionless quantities $$\bar{y} = \frac{y_0}{Y_0}, \bar{x} = \frac{x_0}{l}$$

$$(1-\bar{x})^2\frac{d^2\bar{y}}{d\bar{x}^2} + 4(1-\bar{x})\frac{d\bar{y}}{d\bar{x}} + 6\bar{y} = \frac{3}{lnH} - \frac{9}{lnH}ln(1-\bar{x}) \quad (42)$$

To convert to a linear equation with constant coefficients, let $$\bar{z} = ln(1-\bar{x}), \frac{d\bar{y}}{d\bar{x}} = -e^{-\bar{z}}\frac{d\bar{y}}{d\bar{z}}, \frac{d^2\bar{y}}{d\bar{x}^2} = e^{-2\bar{z}}\left(\frac{d^2\bar{y}}{d\bar{z}^2} - \frac{d\bar{y}}{d\bar{z}}\right)$$

which reduces Equation 42 to $$\frac{d^2\bar{y}}{d\bar{z}^2} - 5\frac{d\bar{y}}{d\bar{z}} + 6\bar{y} = \frac{3}{lnH}(1-3\bar{z}) \quad (43)$$

The solution of this equation, for the initial conditions $$\bar{y} = 0, \bar{z} = 0, \frac{d\bar{y}}{d\bar{z}} = 0$$

is $$\bar{y}lnH = \frac{3}{4}e^{2\bar{z}} - \frac{3}{2}\bar{z} - \frac{3}{4} \quad (44)$$

Substituting back for $\bar{z}$ $$\bar{y} = \frac{3}{4lnH}[(1-\bar{x})^2 - 2ln(1-\bar{x}) - 1] \quad (45)$$

This is the dimensionless equation for spring backing profile. From Equation 40, for $\delta = Y_0/2$, the maximum value of $\bar{x}$ is $$\bar{x}_m = 1 - \frac{1}{H^{1/3}}$$

Figure 6:
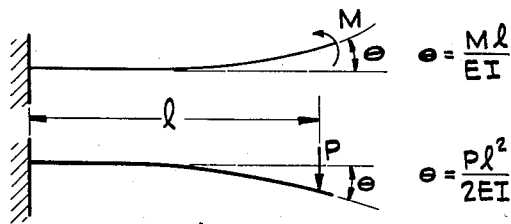
Figure 7:
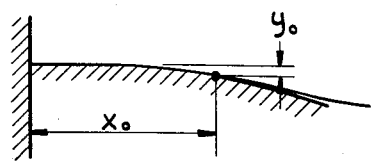

The cross-section of the leaf must satisfy Equation 38. Stress analysis of the spring shows that the maximum moment occurs at the end away from the backing. The moment here is determined for the load $$\frac{F}{2}$$

between $$\frac{F_0}{2}$$

and $$\frac{HF_0}{2}$$

when the last contact point on the backing is $(x_0, y_0)$, using the principle of superposition for the two cases shown in Figure 6. Referring to Figure 7, the tip is given an angular deflection, relative to the tangent, $$\frac{dy_0}{dx_0}$$

of $$\frac{dy_0}{dx_0} = \frac{M(l-x_0)}{EI} - \frac{P(l-x_0)^2}{2EI} \quad (47)$$

Obtaining $$\frac{dy_0}{dx_0}$$

from Equation 45 and solving for M, which is the moment, using $$P = \frac{F_0}{2} \frac{l^3}{(l-x_0)^3}$$

yields $$M = \frac{F_0 l}{8}\left[\frac{3}{(1-\bar{x})^2} - 1\right]$$

The maximum value of M occurs for $\bar{x} = \bar{x}_m$. Using Equation 46

$$M_{max} = \frac{F_0 l}{8}(3H^{2/3} - 1) \quad (48)$$

The maximum fibre stress, $S_m$, is given by $$S_m = \frac{M_{max}}{I}\frac{t_s}{2} = \frac{3F_0 l}{4bt_s^2}(3H^{2/3} - 1) \quad (49)$$

where $t_s$ is the leaf thickness and $b$ its width. Equation 49, plus Equation 38 permit the thickness and width to be expressed in terms of $S_m$ and $l$, as $$\frac{t_s}{l^2} = \frac{4}{3}\frac{S_m}{EY_0}\frac{lnH}{(3H^{2/3}-1)} \quad (50)$$

$$bl^3 = \frac{27}{64}\frac{F_0}{S_m^3}(EY_0)^2\frac{(3H^{2/3}-1)^3}{(lnH)^2} \quad (51)$$

From the foregoing it will be observed that devices embodying the principles of the present invention as by embodying non-linear spring elements obeying the laws hereinabove set forth and having poppet heads or orifice throats profiled in accordance with the law set forth hereinabove, there will be provided adjustable flow control units which are operable to maintain fluid flow substantially constant at the selected values therefor substantially independent of fluid pressure and substantially independent of fluid pressure changes and drops across the valve.

It will also be observed the numerous variations and modifications in the structures set forth, and illustrated, may be made without departing from the true spirit and scope of the novel concepts and principles of this invention. I, therefore, intend to cover all such modifications and variations as fall within the true spirit and scope of the novel concepts and principles of this invention.

I claim as my invention:

1. In a fluid flow control device, flow orifice means and valve poppet means cooperatively arranged with said orifice means to vary the fluid flow area therebetween, one of said means having a surface of revolution defined by the profile law $$x = \frac{2Y_0}{lnH}\left\{ln\left[2\sqrt{2}\frac{r_0 \pm \frac{t}{2}}{r'^2 - r_0^2}\frac{Y_0}{lnH}\sqrt{1 - \sqrt{1 - \left(\frac{tlnH}{Y_0}\right)^2}}\right] - \frac{1}{2}\left[1 - \sqrt{1 - \left(\frac{tlnH}{Y_0}\right)^2}\right]\right\}$$

in which:

$x$ is the axial coordinate of the surface of revolution
$Y_0$ is the travel of the supported means relative to the other
$ln$ is the natural logarithm
$H$ is the ratio of maximum design fluid head to minimum design fluid head
$r_0$ is the radius of the means other than the means having the surface of revolution
$r'$ is the minimum radius of the surface of revolution
$t$ is the radial distance $r - r_0$
$r$ is the radial coordinate of the surface of revolution, and a non-linear resilient spring supporting one of said means and having a non-linear resilient deflection defined by $$\frac{Y_0}{2lnh}ln\frac{2F}{F_0} + \frac{F_0 l^3}{24EI} = \frac{1}{6}(l-x_0)^2\frac{d^2y_0}{dx_0^2} + \frac{2}{3}(l-x_0)\frac{dy_0}{dx_0} + y_0$$

in which:

$Y_0$ is the position of the spring for $h$ equals $h_0$ where $h$ is the fluid head drop across the poppet means and $h_0$ is the minimum design fluid head loss across the poppet
$ln$ is the natural logarithm
$H$ is the fluid head drop across the supported means
$H_0$ is the minimum design fluid head loss across the supported means
$F$ is the pressure force on the supported means
$F_0$ is the minimum design force on the supported means
$l$ is the length of the spring for load $F_0/2$
$E$ is the modulus of elasticity
$I$ is the moment of inertia of spring section about neutral axis
$y_0$ is the coordinate of spring support
$x_0$ is the coordinate of spring support whereby fluid flow through said device is maintained substantially constant substantially independent of fluid pressure and variations therein.

2. In a fluid flow control device, flow orifice means and valve poppet means cooperatively arranged with said orifice means to vary the fluid flow area therebetween, said valve poppet means having a surface of revolution defined by the profile law $$x = \frac{2Y_0}{lnH}\left\{ln\left[2\sqrt{2}\frac{r_0 - \frac{t}{2}}{r'^2 - r_0^2}\frac{Y_0}{lnH}\sqrt{1 - \sqrt{1 - \left(\frac{tlnH}{Y_0}\right)^2}}\right] - \frac{1}{2}\left[1 - \sqrt{1 - \left(\frac{tlnH}{Y_0}\right)^2}\right]\right\}$$

in which:

$x$ is the axial coordinate of the surface of revolution
$Y_0$ is the travel of the poppet means
$ln$ is the natural logarithm
$H$ is the ratio of maximum design fluid head to minimum design fluid head
$r_0$ is the radius of the orifice means
$r'$ is the minimum radius of the surface of revolution
$t$ is the radial distance $r - r_0$
$r$ is the radial coordinate of the surface of revolution, and a non-linear resilient spring supporting said valve poppet means and having a non-linear resilient deflection defined by $$\frac{Y_0}{2lnh}ln\frac{2F}{F_0} + \frac{F_0 l^3}{24EI} = \frac{1}{6}(l-x_0)^2\frac{d^2y_0}{dx_0^2} + \frac{2}{3}(l-x_0)\frac{dy_0}{dx_0} + y_0$$

in which:

$Y_0$ is the position of the spring for $h$ equals $h_0$ where $h$ is the fluid head loss across the poppet means and $h_0$ is the minimum design fluid head loss across the poppet means
$ln$ is the natural logarithm
$H$ is the fluid head drop across the poppet
$H_0$ is the minimum design fluid head loss across the poppet
$F$ is the pressure force on the poppet
$F_0$ is the minimum design force on the poppet
$l$ is the length of the spring for load $F_0/2$
$E$ is the modulus of elasticity
$I$ is the moment of inertia of spring section about neutral axis
$y_0$ is the coordinate of spring support
$x_0$ is the coordinate of spring support whereby fluid flow through said device is maintained substantially constant substantially independent of fluid pressure and variations therein.

3. In a fluid flow control device, flow orifice means and valve poppet means cooperatively arranged with said orifice means to vary the fluid flow area therebetween, said flow orifice means having a surface of revolution defined by the profile law $$x=\frac{2Y_0}{lnH}\left\{ln\left[2\sqrt{2}\frac{r_0+\frac{t}{2}}{r'^2-r_0^2}\frac{Y_0}{lnH}\sqrt{1-\sqrt{1-\left(\frac{tlnH}{Y_0}\right)^2}}\right]-\frac{1}{2}\left[1-\sqrt{1-\left(\frac{tlnH}{Y_0}\right)^2}\right]\right\}$$

in which:

$x$ is the axial coordinate of the surface of revolution
$Y_0$ is the travel of the poppet means relative to the orifice means
$ln$ is the natural logarithm
$H$ is the ratio of maximum design fluid head to minimum design fluid head
$r_0$ is the radius of the poppet means
$r'$ is the minimum radius of the surface of revolution
$t$ is the radial distance $r-r_0$
$r$ is the radial coordinate of the surface of revolution, and a non-linear resilient spring supporting said valve poppet means and having a non-linear resilient deflection defined by $$\frac{Y_0}{2lnh}ln\frac{2F}{F_0}+\frac{F_0 l^3}{24EI}=\frac{1}{6}(l-x_0)^2\frac{d^2y_0}{dx_0^2}+\frac{2}{3}(l-x_0)\frac{dy_0}{dx_0}+y_0$$

in which:

$Y_0$ is the position of the spring for $h$ equals $h_0$ where $h$ is the fluid head across the poppet means and $h_0$ is the minimum design fluid head loss across the poppet means
$ln$ is the natural logarithm
$H$ is the fluid head drop across the poppet means
$H_0$ is the minimum design fluid head loss across the poppet means
$F$ is the pressure force on the poppet means
$F_0$ is the minimum design force on the poppet means
$l$ is the length of the spring for load $F_0/2$
$E$ is the modulus of elasticity
$I$ is the moment of inertia of spring section about neutral axis
$y_0$ is the coordinate of spring support
$x_0$ is the coordinate of spring support whereby fluid flow through said device is maintained substantially constant substantially independent of fluid pressure and variations therein.

4. In a fluid flow control device, flow orifice means and valve poppet means cooperatively arranged with said orifice means to vary the fluid flow area therebetween, guide fins between the orifice means and poppet means, one of said means having a surface of revolution defined by the profile law $$x=\frac{2Y_0}{lnH}\left\{ln\left[2\sqrt{2}\frac{r_0\pm\frac{t}{2}-\frac{b'}{2\pi}}{(r'-r_0)(r'+r_0-b'/\pi)}\frac{Y_0}{lnH}\sqrt{1-\sqrt{1-\left(\frac{tlnH}{Y_0}\right)^2}}\right]-\frac{1}{2}\left[1-\sqrt{1-\left(\frac{tlnH}{Y_0}\right)^2}\right]\right\}$$

in which:

$x$ is the axial coordinate of the surface of revolution
$Y_0$ is the travel of one of the supported means relative to the other
$ln$ is the natural logarithm
$H$ is the ratio of maximum design fluid head to minimum design fluid head
$r_0$ is the radius of said means not having the surface of revolution
$r'$ is the minimum radius of the surface of revolution
$t$ is the radial distance $r-r_0$
$r$ is the radial coordinate of the surface of revolution
$b'$ is the thickness of the guide fins, and a resilient spring supporting one of said means and having a non-linear deflection defined by $$\frac{Y_0}{2lnh}ln\frac{2F}{F_0}+\frac{F_0 l^3}{24EI}=\frac{1}{6}(l-x_0)^2\frac{d^2y_0}{dx_0^2}+\frac{2}{3}(l-x_0)\frac{dy_0}{dx_0}+y_0$$

in which:

$Y_0$ is the position of the spring for $h$ equals $h_0$ where $h$ is the fluid head across the poppet means and $h_0$ is the minimum design fluid head across the poppet means
$ln$ is the natural logarithm
$H$ is the fluid head drop across the supported means
$H_0$ is the minimum design fluid head loss across the supported means
$F$ is the pressure force on the supported means
$F_0$ is the minimum design force on the supported means
$l$ is the length of the spring for load $F_0/2$
$E$ is the modulus of elasticity
$I$ is the moment of inertia of spring section about neutral axis
$y_0$ is the coordinate of spring support
$x_0$ is the coordinate of spring support whereby fluid flow through said device is maintained substantially constant substantially independent of fluid pressure and variations therein.

5. In a fluid flow control device, flow orifice means and valve poppet means cooperatively arranged with said orifice means to vary the fluid flow area therebetween, guide fins between the orifice means and poppet means, said valve poppet means having a surface of revolution defined by the profile law $$x=\frac{2Y_0}{lnH}\left\{ln\left[2\sqrt{2}\frac{r_0-\frac{t}{2}-\frac{b'}{2\pi}}{(r'-r_0)(r'+r_0-b'/\pi)}\frac{Y_0}{lnH}\sqrt{1-\sqrt{1-\left(\frac{tlnH}{Y_0}\right)^2}}\right]-\frac{1}{2}\left[1-\sqrt{1-\left(\frac{tlnH}{Y_0}\right)^2}\right]\right\}$$

in which:

$x$ is the axial coordinate of the surface of revolution
$Y_0$ is the travel of the poppet means
$ln$ is the natural logarithm
$H$ is the ratio of maximum design fluid head to minimum design fluid head
$r_0$ is the radius of the orifice means
$r'$ is the minimum radius of the surface of revolution
$t$ is the radial distance $r-r_0$
$r$ is the radial coordinate of the surface of revolution
$b'$ is the thickness of the guide fins, and a resilient non-linear spring supporting said valve poppet means and having a non-linear resilient deflection defined by $$\frac{Y_0}{2lnh}ln\frac{2F}{F_0}+\frac{F_0l^3}{24EI}=\frac{1}{6}(l-x_0)\frac{d^2y_0}{dx_0}+\frac{2}{3}(l-x_0)\frac{dy_0}{dx_0}+y_0$$

in which:

$Y_0$ is the position of the spring for $h$ equals $h_0$ where $h$ is the fluid head across the poppet means and $h_0$ is the minimum design fluid head across the poppet means
$ln$ is the natural logarithm
$H$ is the fluid head drop across the poppet means
$H_0$ is the minimum design fluid head loss across the poppet means
$F$ is the pressure force on the poppet means
$F_0$ is the minimum design force on the poppet means
$l$ is the length of the spring for load $F_0/2$
$E$ is the modulus of elasticity
$I$ is the moment of inertia of spring section about neutral axis
$y_0$ is the coordinate of spring support
$x_0$ is the coordinate of spring support whereby fluid flow through said device is maintained substantially constant substantially independent of fluid pressure and variations therein.

6. In a fluid flow control device, flow orifice means and valve poppet means cooperatively arranged with said orifice means to vary the fluid flow area therebetween, guide fins between the orifice means and poppet means, said flow orifice means having a surface of revolution defined by the profile law $$x=\frac{2Y_0}{lnH}\left\{ln\left[2\sqrt{2}\frac{r_0+\frac{t}{2}-\frac{b'}{2\pi}}{(r'-r_0)(r'+r_0-b'/\pi)}\frac{Y_0}{lnH}\sqrt{1-\sqrt{1-\left(\frac{tlnH}{Y_0}\right)^2}}\right]-\frac{1}{2}\left[1-\sqrt{1-\left(\frac{tlnH}{Y_0}\right)^2}\right]\right\}$$

in which:

$x$ is the axial coordinate of the surface of revolution
$Y_0$ is the travel of said poppet
$ln$ is the natural logarithm
$H$ is the ratio of maximum design fluid head to minimum design fluid head
$r_0$ is the radius of the poppet means
$r'$ is the minimum radius of the surface of revolution
$t$ is the radial distance $r-r_0$
$r$ is the radial coordinate of the surface of revolution
$b'$ is the thickness of the guide fins, and a non-linear resilient spring supporting said valve poppet means and having a non-linear resilient deflection defined by $$\frac{Y_0}{2lnh}ln\frac{2F}{F_0}+\frac{F_0l^3}{24EI}=\frac{1}{6}(l-x_0)\frac{d^2y_0}{dx_0^2}+\frac{2}{3}(l-x_0)\frac{dy_0}{dx_0}+y_0$$

in which:

$Y_0$ is the position of the spring for $h$ equals $h_0$ where $h$ is the fluid head across the poppet means and $h_0$ is the minimum design fluid head across the poppet means
$ln$ is the natural logarithm
$H$ is the fluid head drop across the poppet means
$H_0$ is the minimum design fluid head loss across the poppet means
$F$ is the pressure force on the poppet means
$F_0$ is the minimum design force on the poppet means
$l$ is the length of the spring for load $F_0/2$
$E$ is the modulus of elasticity
$I$ is the moment of inertia of spring section about neutral axis
$y_0$ is the coordinate of spring support
$x_0$ is the coordinate of spring support whereby fluid flow through said device is maintained substantially constant, substantially independent of fluid pressure and variations therein.

7. In a fluid flow control device, flow orifice means and valve poppet means cooperatively arranged with said orifice means to vary the fluid flow area therebetween, said valve poppet means having a surface of revolution defined by the profile law $$x=\frac{2Y_0}{lnH}\left\{ln\left[2\sqrt{2}\frac{r_0-\frac{t}{2}}{r'^2-r_0^2}\frac{Y_0}{lnH}\sqrt{1-\sqrt{1-\left(\frac{tlnH}{Y_0}\right)^2}}\right]-\frac{1}{2}\left[1-\sqrt{1-\left(\frac{tlnH}{Y_0}\right)^2}\right]\right\}$$

in which:

$x$ is the axial coordinate of the surface of revolution
$Y_0$ is the travel of the poppet means
$ln$ is the natural logarithm
$H$ is the ratio of maximum design fluid head to minimum design fluid head
$r_0$ is the radius of the orifice means
$r'$ is the minimum radius of the surface of revolution
$t$ is the radial distance $r-r_0$
$r$ is the radial coordinate of the surface of revolution, and a non-linear resilient coil spring having variously spaced convolutions supporting said valve poppet means and having a non-linear resilient deflection defined by $$h=h_0He^{-\frac{ylnH}{Y_0}}$$

in which:

$h$ is the fluid head drop across the poppet means
$h_0$ is the minimum design fluid head loss across the poppet means
$H$ is the ratio of maximum design fluid head to minimum design fluid head
$e$ is the base of natural logarithms
$y$ is the position of the spring
$ln$ is the natural logarithm
$Y_0$ is the position of the spring for $h$ equals $h_0$, whereby fluid flow through said device is maintained substantially constant substantially independent of fluid pressure and variations therein.

8. In a fluid flow control device, flow orifice means and valve poppet means cooperatively arranged with said orifice means to vary the fluid flow area therebetween, guide fins between said orifice means and said poppet means, said valve poppet means having a surface of revolution defined by the profile law $$x=\frac{2Y_0}{lnH}\left\{ln\left[2\sqrt{2}\frac{r_0-\frac{t}{2}-\frac{b'}{2\pi}}{(r'-r_0)(r'+r_0-b'/\pi)}\frac{Y_0}{lnH}\sqrt{1-\sqrt{1-\left(\frac{tlnH}{Y_0}\right)^2}}\right]-\frac{1}{2}\left[1-\sqrt{1-\left(\frac{tlnH}{Y_0}\right)^2}\right]\right\}$$

in which:

$x$ is the axial coordinate of the surface of revolution
$Y_0$ is the travel of one of said means relative to the other
$ln$ is the natural logarithm
$H$ is the ratio of maximum design fluid head to minimum design fluid head
$r_0$ is the radius of the other of said means
$r'$ is the minimum radius of the surface of revolution
$t$ is the radial distance $r-r_0$
$r$ is the radial coordinate of the surface of revolution
$b'$ is the thickness of the guide fins, and a resilient non-linear coil spring having variously spaced convolutions supporting said valve poppet means and having a non-linear resilient deflection defined by $$h = h_0 H e^{-\frac{y \ln H}{Y_0}}$$

in which:

$h$ is the fluid head drop across the poppet means
$h_0$ is the minimum design fluid head loss across the poppet means
$H$ is the ratio of maximum design fluid head to minimum design fluid head
$e$ is the base of natural logarithms
$y$ is the position of the spring
$ln$ is the natural logarithm
$Y_0$ is the position of the spring for $h$ equals $h_0$, whereby fluid flow through said device is maintained substantially constant substantially independent of fluid pressure and variations therein.

9. In a fluid flow control device, flow orifice means and valve popet means cooperatively arranged with said orifice means to vary the fluid flow area therebetween, one of said means having a surface of revolution defined by the profile law $$C_D A = (C_D A)_{min} \, e^{-\frac{x' \ln H}{2 Y_0}}$$

in which:

$C_D$ is the discharge coefficient
$A$ is the area of the opening between the poppet means and the orifice means
$e$ is the base of natural logarithms
$x'$ is the position of the poppet means relative to the orifice means
$ln$ is the natural logarithm
$H$ is the ratio of maximum design fluid head to minimum design fluid head
$Y_0$ is the travel of the supported means, and a non-linear resilient spring supporting one of said means and having a non-linear resilient deflection defined by $$h = h_0 H e^{-\frac{y \ln H}{Y_0}}$$

in which:

$h$ is the fluid head drop across the poppet means
$h_0$ is the minimum design fluid head loss across the poppet means
$H$ is the ratio of maximum design fluid head to minimum design fluid head
$e$ is the base of natural logarithms
$y$ is the position of the spring
$ln$ is the natural logarithm
$Y_0$ is the position of the spring for $h$ equals $h_0$, whereby fluid flow through said device is maintained substantially constant substantially independent of fluid pressure and variations therein.

10. In a fluid flow control device, flow orifice means and valve poppet means cooperatively arranged with said orifice means to vary the fluid flow area therebetween, said valve poppet means having a surface of revolution defined by the profile law $$C_D A = (C_D A)_{min} \, e^{-\frac{x' \ln H}{2 Y_0}}$$

in which:

$C_D$ is the discharge coefficient
$A$ is the area of the opening between the poppet means and the orifice means
$e$ is the base of natural logarithms
$x'$ is the position of the poppet means relative to the orifice means
$ln$ is the natural logarithm
$H$ is the ratio of maximum design fluid head to minimum design fluid head
$Y_0$ is the travel of the supported means, and a none-linear resilient spring supporting said valve poppet means and having a non-linear resilient deflection defined by $$h = h_0 H e^{-\frac{y \ln H}{Y_0}}$$

in which:

$h$ is the fluid head drop across the poppet means
$h_0$ is the minimum design fluid head loss across the poppet means
$H$ is the ratio of maximum design fluid head to minimum design fluid head
$e$ is the base of natural logarithms
$y$ is the position of the spring
$ln$ is the natural logarithm
$Y_0$ is the position of the spring for $h$ equals $h_0$.

whereby fluid flow through said device is maintained substantially constant substantially independent of fluid pressure and variations therein.

References Cited in the file of this patent

UNITED STATES PATENTS

| | | |
|---|---|---|
| 1,658,547 | Aseltine | Feb. 7, 1928 |
| 1,904,337 | Turner | Apr. 18, 1933 |
| 1,944,088 | Linderoth | Jan. 16, 1934 |
| 2,086,321 | Kudo | July 6, 1936 |
| 2,117,891 | Kalin | May 17, 1938 |
| 2,399,938 | Pett | May 7, 1946 |
| 2,827,076 | Obermaier | Mar. 18, 1958 |

OTHER REFERENCES

A.S.M.E. Transactions (Clurman), vol. 73, pub. by A.S.M.E., 1951, pp. 155–161. (Copy in Scientific Library.)